United States Patent [19]

Wempe et al.

[11] 4,420,591

[45] Dec. 13, 1983

[54] METHOD FOR REDUCING WALL FOULING IN VINYL CHLORIDE POLYMERIZATION

[75] Inventors: Lawrence K. Wempe, Center Valley; Bernard D. Bauman, Coopersburg, both of Pa.

[73] Assignee: Air Products and Chemicals, Inc., Allentown, Pa.

[21] Appl. No.: 365,117

[22] Filed: Apr. 5, 1982

[51] Int. Cl.$^3$ .............................................. C08F 14/06
[52] U.S. Cl. ........................................ 526/62; 526/74; 526/330; 526/344; 526/344.2
[58] Field of Search ................ 526/74, 344, 62, 344.2, 526/330

[56] References Cited

U.S. PATENT DOCUMENTS

| | | | |
|---|---|---|---|
| 3,562,238 | 2/1971 | Parks | 260/92.8 |
| 3,778,423 | 12/1973 | Reiter | 260/92.8 |
| 3,926,910 | 12/1975 | Mowdood | 260/45.95 |
| 3,997,707 | 12/1976 | Aruga et al. | 526/62 |
| 4,007,320 | 2/1977 | Petersen | 526/62 |
| 4,016,341 | 4/1977 | Ogawa et al. | 526/62 |
| 4,024,301 | 5/1977 | Witenhafer et al. | 427/230 |
| 4,105,840 | 8/1978 | Cohen | 526/62 |
| 4,136,242 | 1/1979 | Koyanagi et al. | 526/74 |
| 4,180,634 | 12/1979 | Koyanagi et al. | 526/74 |
| 4,294,945 | 10/1981 | Wei | 526/74 |
| 4,359,560 | 11/1982 | Bauman | 526/74 |

*Primary Examiner*—Harry Wong, Jr.
*Attorney, Agent, or Firm*—Russell L. Brewer; E. E. Innis; J. C. Simmons

[57] ABSTRACT

This invention relates to an improvement for reducing the amount of wall fouling in the suspension polymerization of vinyl chloride. The improvement resides in wetting the reactor surface with a solution containing selenous acid prior to charging the vinyl chloride recipe to the reactor. Preferably, the surface of the resulting reactor is heated at a temperature of from 40°–100° C. prior to charging the recipe.

4 Claims, No Drawings

METHOD FOR REDUCING WALL FOULING IN VINYL CHLORIDE POLYMERIZATION

BACKGROUND OF THE PRIOR ART

1. Field of the Invention

This invention relates to a method for reducing the wall fouling normally occurring in stainless steel reactors used for the suspension polymerization of vinyl chloride systems.

2. Description of the Prior Art

Wall fouling in reactors used for the suspension polymerization of vinyl chloride systems has been a problem, and particularly so in recent years because of the tight constraints imposed on vinyl chloride emission to the atmosphere. Several obvious advantages would be achieved by reducing wall fouling. First, productivity of the reactors could be increased in that the reactors would not have to be taken out of service as often for cleaning. Second, there is less product contamination due to particulate material dropping from the reactor surface into the product.

Some of the techniques used in reducing polymer deposit in the polymerization of vinyl chloride are described in the following patents:

U.S. Pat. No. 3,778,423 discloses a process for reducing polymer deposit in a glass lined reactor by wetting the reactor surface with a solution containing a free radical inhibitor, e.g., a polar organic compound such as alpha-methyl styrene or a chain terminating agent such as an amine, e.g., ethylenediamine tetraacetic acid; fatty acids, an aldehyde such as acrolein, methacrolein and a conjugated diolefin such as isoprene or butadiene.

U.S. Pat. No. 3,562,238 discloses a process for reducing reactor wall fouling in vinyl chloride polymerization by incorporating less than 1,000 ppm (based on the monomers) of magnesium hydroxide in the polymer recipe.

U.S. Pat. No. 3,926,910 discloses a method for reducing reactor wall fouling in vinyl chloride polymerization processes by incorporating from about 0.001 to about 0.02 parts of a nitrite salt per 100 parts monomer onto the reactor surface prior to forming resinous material. The nitrite can be included in the polymerization recipe or sprayed onto the reactor surface as an aqueous solution.

U.S. Pat. No. 4,024,301 discloses the addition of a branched polyaromatic amine such as o-phenylene diamine as a coating for the reactor surface.

U.S. Pat. No. 3,997,707 discloses the addition of oxalic acid or its salt to the polymerization recipe in an effort to reduce wall fouling.

SUMMARY OF THE INVENTION

This invention relates to an improved process for reducing reactor wall fouling in the suspension polymerization of a recipe comprising water, vinyl chloride or a mixture of vinyl chloride and other vinyl monomers copolymerizable therewith, a suspension agent, and free radical initiator. The improvement for reducing wall fouling in stainless steel reactors comprises wetting the internal reactor surfaces, including turbine blades and shafts, baffles, and cooling coils with a solution comprising selenous acid optionally containing salts, e.g. copper sulfate, prior to charging the recipe to the reactor. In a preferred embodiment, the reactor surface is contacted with the selenous acid solution and the reactor surface is heated to a temperature of from about 40°–100° C. for at least 5 minutes prior to charging the recipe.

Although many of the above prior art systems reduced wall fouling, the treatment methods are often difficult to perform and the treating compositions quite expensive. In many instances the results, even though the methods were utilized, were marginal.

Several advantages can be achieved by this process, and they include:

a solution, which is relatively inexpensive compared to many prior art systems;

a treatment method which is capable of reducing vinyl chloride polymer deposition, particularly vinyl chloride-vinyl acetate copolymer deposition, in stainless steel reactors to a level at least equal to, if not better, than many of the reported commercially used processes; and a mechanism for reducing polymer deposition utilizing a solution which is relatively noncorrosive to commercial equipment and in addition, relatively easy to handle.

DESCRIPTION OF THE PREFERRED EMBODIMENT

The present invention is based upon the discovery that a solution containing selenous acid when applied to the internal surface of a stainless steel reactor can effectively reduce the amount of polymer deposition normally associated with the suspension polymerization of vinyl chloride homopolymer and copolymer systems.

The selenous acid is included in the treating solution in an effective amount of from about 0.0001–10% by weight, and preferably between about 0.01–5% by weight of the solution. Any solvent in which the selenous acid is inert and soluble or dispersible therein, can be utilized in practicing this invention. These solvents include lower alkanols having from 1 to 4 carbon atoms and water. In most situations, though, the solvents that can be used are severely limited. Some, although effective for permitting a reduction in polymer deposition may cause polymer degradation or discoloration. For these reasons, it is necessary to determine the effect that any residual solvent may have on the finished polymer in terms of degradation or discoloration prior to use. The preferred solvent for use in treating the interior reactor surfaces is water. It provides desirable results without affecting product quality or effecting polymer degradation or polymer discoloration. Of the lower alkanols, methanol and ethanol are preferred, although these solvents are not as desirable as water.

A low pH solution (0.01 to 3) is important for achieving the most desirable results. For example, if the pH is above about 4, then one may experience higher deposition levels than at a pH of 2. The pH of the solution can be adjusted by addition of mineral acid, e.g. hydrochloric or sulfuric acid.

In some cases it may be preferable to add a small amount of a conventional wetting agent, e.g., a surfactant or emulsifier which is soluble in the solution to the treating solution. The wetting agent or surfactant may enhance the coverage of the reactor surface particularly where there is a polymer deposit on the reactor walls. The decision to use a surfactant generally is based on viewing the coating of the reactor surface and ascertaining the coverage being effected. If the coverage is small, and the treating solution appears to "run off" the polymer surface, then surfactants should be included in the solution. Typically, surfactant concentrations of 0.005-0.5% based on the weight of the solution or as recommended by manufacturers are used. Conventional cationic, anionic and non-ionic surfactants can be used. Particular cationic surfactants include quaternary ammonium aryl halides.

In order to reduce the wall fouling the selenous acid solution is applied to the internal reactor surface, including agitator blades, agitator shaft, baffles, and other elements therein in sufficient amount to wet the interior surfaces prior to charging the recipe. The application of the selenous acid solution can be conducted in many ways, but the simplest and fastest is to spray the solution directly onto the reactor surfaces. In addition, it normally results in the usage of less material. Alternatively, the reactor can be charged with the selenous acid solution and stirred by means of the reactor agitator and then drained. After the internal reactor surfaces have been contacted with the selenous acid solution, the excess solution is drained from the reactor. The reactor then in a broad sense is ready to be charged with the vinyl chloride polymerization recipe.

Although the wetting of the internal surface of the stainless steel reactor with the selenous acid solution can result in reducing polymer deposition in the suspension polymerization of vinyl chloride, it has been found on many occasions that superior results are obtained if the solution is "baked" onto the surface of the reactor prior to charging the polymer reaction mixture or recipe. Baking of the solution onto the reactor surface is accomplished by heating the reactor surface to a temperature of from about 40° to about 100° C., and preferably to about 60°-80° C. for at least 5 minutes, and preferably from about 10-30 minutes. Longer baking cycles, i.e., those longer than 30 minutes are not required and do not seem to result in any significant advantages. However, baking cycles of as long as 10 hours may be used without adverse effect. It is possible to heat the reaction surface simultaneously with the spraying of the selenous acid solution onto the reactor surface and to terminate heating after spraying. The better method is to heat for a few minutes after spraying.

The vinyl chloride recipes which are suspension polymerized to form a homopolymer or copolymer generally contain water in an amount to provide from about 35-65% solids; from about 0.05%-1.5% of a suspending agent, e.g., carboxymethyl cellulose, hydroxypropyl, and from about 0.01-0.5% of a monomer soluble polymerization initiator, e.g., azo bis-valeronitrile, t-butyl perneodecanoates, t-butyl peroxypivalate, lauroyl peroxide, etc. Other monomers copolymerizable with vinyl chloride can be added, and these include vinyl acetate, vinylidine chloride, butyl acrylate, ethylene, propylene, diethyl fumarate, and diethyl maleate. Of these, vinyl acetate in an amount of from 5-20% by weight of the polymer formed is preferred.

The following examples are intended to illustrate preferred embodiments of the invention and are not intended to restrict the scope thereof. The examples also provide the best modes for practicing the invention.

EXAMPLE 1

Because of the difficulty in obtaining reproductiblity of data in suspension polymerization processes, particularly with respect to reducing wall fouling in the reactor, several laboratory runs were made with identical polymer recipes. The results were evaluated based on the number of grams polymer retained, exclusive of a loose material, in the reactor after a set number of batches had been conducted.

The laboratory reactor used in the evaluation was a Chemco MDX-GJ model 1½ liter 316 stainless steel reactor. The reactor had an electropolished surface.

In the runs relating to the process of this invention, the general method was to wet the reactor surface thoroughly by spraying the walls with the solution designated and then draining the excess from the reactor prior to charging the recipe. During wetting, the reactor jacket surface was maintained at about 65°-70° C. prior to charging the recipes. The number of batches carried out in the reactor and the fouling, i.e. the total grams of material deposited upon the reactor surfaces, exclusive of loose material, were recorded. Table 1 below gives the results.

TABLE 1

| RUN | ANTI-FOULING TREATMENT | BATCHES | TOTAL FOULING (grams) | RESIN |
|---|---|---|---|---|
| 1 | Control - no Treatment | 2 | 6.9 | Vinyl Chloride Homopolymer |
| 2 | Control - no Treatment | 2 | 8.5 | Vinyl Chloride Homopolymer |
| 3 | Aqueous gun blue solution $H_2SeO_3$ 111 ppm $CuSO_4$ 4.3% pH < 0.1 | 2 | 2.2 | Vinyl Chloride Homopolymer |
| 4 | Aqueous 0.01% $H_2SeO_3$ pH < 3 | 1 | 2.9 | Vinyl Chloride Homopolymer |
| 5 | Aqueous 0.01% $H_2SeO_3$ pH > 3 | 1 | 6.4 | Vinyl Chloride Homopolymer |
| 6 | Aqueous 1% $H_2SeO_3$ | 1 | 2.5 | Vinyl Chloride Homopolymer |
| 7 | Control | 1 | 11.9 | Vinyl Chloride-Vinyl Acetate (8.5% Vinyl Acetate) |
| 8 | Aqueous Gun Blue Solution | 1 | 4.6 | Vinyl Chloride-Vinyl Acetate (8.5% Vinyl Acetate) |
| 9 | Control | 3 | 4.5 | Vinyl Chloride-Vinyl Acetate (15% Vinyl Acetate) |
| 10 | Aqueous Gun Blue Solution | 3 | 0.5 | Vinyl Chloride-Vinyl Acetate (15% Vinyl Acetate) |

The results in Table 1 indicate that for a commercial vinyl chloride homopolymer resin the selenous acid solution at low pH was effective in reducing wall fouling. Runs 5 and 6 show the importance of keeping the selenous acid solution at a low pH e.g., below 3, to achieve better results. Runs 7-10 show the highly unexpected reduction in wall fouling for commercial vinyl chloride-vinyl acetate suspension resin recipes using selenous acid solutions combined with copper sulfate. Although numerous systems have been described in the prior art with respect to reducing wall fouling in vinyl chloride polymerization, very few of these systems have actually been significantly effective in reducing wall fouling in the vinyl acetate copolymer systems.

EXAMPLE 2

Another series of runs were made utilizing a 1.5 liter Chemco reactor of the type used in Example 1. In the 1.5 liter series of runs, the suspension polymer was a vinyl chloride-vinyl acetate copolymer containing about 13% vinyl acetate by weight. The recipe was essentially the same as used in the manufacture of 7121 vinyl chloride-vinyl acetate resin sold by Air Products and Chemicals, Inc.

The results in the 1.5 liter laboratory reactor show that an aqueous solution of selenous acid is highly effective for reducing wall fouling. The results are shown in Table 2.

TABLE 2

| RUN | ANTI-FOULING TREATMENT | BAKE | BATCHES | TOTAL FOULING (grams) | RESIN |
|---|---|---|---|---|---|
| 1 | Control | 60° C. - 15 min. | 3 | 44 | Vinyl Chloride-Vinyl Acetate (13%) |
| 2 | 4.0% Aqueous $H_2SeO_3$ | 60° C. - 15 min. | 3 | 10.7 | Vinyl Chloride-Vinyl Acetate (13%) |
| 3 | 4.0% $H_2SeO_3$ + 0.7% $Cu(NO_3)_2$ | 60° C. - 15 min. | 3 | 11.2 | Vinyl Chloride-Vinyl Acetate (13%) |
| 4 | 4.0% $H_2SeO_3$ + 5% $HNO_3$ | 60° C. - 15 min. | 3 | 11.9 | Vinyl Chloride-Vinyl Acetate (13%) |
| 5 | 1.6% $CuSO_4.5H_2O$ + 0.5 $H_2SeO_3$ | 60° C. - 15 min. | 3 | 18.3 | Vinyl Chloride-Vinyl Acetate (13%) |
| 6 | 2.0% $CuSO_4.5H_2O$ | 60° C. - 15 min. | 3 | 30.2 | Vinyl Chloride-Vinyl Acetate (13%) |

EXAMPLE 3

A test was carried out in a large commercial reactor to compare the effectiveness of selenous acid solution against other types of wall fouling agents in vinyl chloride polymerization. In this test, a small section of the reactor was coated with an aqueous selenous acid solution and other sections coated with conventional agents. After the twelfth batch, the reactor was heavily fouled and there was a thick skin over the patch where the selenous acid had been applied.

The test results were inconclusive with respect to effectiveness of selenous acid as an antifoulant. But, when comparing to Examples 1 and 2, it did appear that the selenous acid was ineffective when applied initially to the reactor and not reapplied prior to effecting polymerization of each batch. In other words, the effectiveness of selenous acid is short term and must be reapplied as compared with some of the commercial antifoulant systems.

What is claimed is:

1. In a suspension polymerization process wherein a recipe comprising vinyl chloride or a mixture of vinyl chloride and another vinyl monomer, water, a suspension agent, and a monomer soluble polymerization initiator is charged to a stainless steel reactor and subsequently polymerized at an elevated temperature to produce a vinyl chloride containing polymer, the improvement for reducing wall fouling in said stainless steel reactor which comprises:

wetting the internal reactor surface with a solution comprising from about 0.0001–10% by weight of selenous acid and heating the reactor surface to a temperature of from about 40°–100° C. for a period of at least five minutes prior to charging the recipe to the reactor.

2. The process of claim 1 wherein said solution comprises from about 0.01 to 5% of said selenous acid.

3. The process of claim 2 wherein the solution is an aqueous solution.

4. The process of claim 3 wherein the pH of the aqueous solution is from 0.01 to 3.

* * * * *